United States Patent [19]

Iwashita et al.

[11] Patent Number: 5,160,953

[45] Date of Patent: Nov. 3, 1992

[54] CAMERA SYSTEM

[75] Inventors: Tomonori Iwashita, Kanagawa; Sinichi Tsujimoto, Tokyo, both of Japan

[73] Assignee: Canon Kabushiki Kaisha, Tokyo, Japan

[21] Appl. No.: 743,034

[22] Filed: Aug. 9, 1991

Related U.S. Application Data

[63] Continuation of Ser. No. 646,458, Jan. 25, 1991, abandoned, which is a continuation of Ser. No. 400,104, Aug. 29, 1989, abandoned.

[30] Foreign Application Priority Data

| Sep. 1, 1988 | [JP] | Japan | 63-220046 |
| Sep. 1, 1988 | [JP] | Japan | 63-220047 |
| Sep. 1, 1988 | [JP] | Japan | 63-220048 |
| Sep. 1, 1988 | [JP] | Japan | 63-220049 |
| Sep. 1, 1988 | [JP] | Japan | 63-220050 |

[51] Int. Cl.$^5$ ............................................. G03B 1/12
[52] U.S. Cl. ............................................. 354/173.1
[58] Field of Search ................................. 354/173.1

[56] References Cited

U.S. PATENT DOCUMENTS

| 4,728,975 | 3/1988 | Ohara et al. | 354/173.1 |
| 4,821,059 | 4/1989 | Nakanishi et al. | 354/173.1 |
| 4,829,328 | 5/1989 | Tanaka et al. | 354/173.1 |
| 4,855,773 | 8/1989 | Harvey | 354/173.1 |
| 4,864,336 | 9/1989 | Fukahori et al. | 354/173.1 |

FOREIGN PATENT DOCUMENTS

| 55-17175 | 2/1980 | Japan . |
| 58-68027 | 4/1983 | Japan . |
| 59-95520 | 6/1984 | Japan . |
| 60-45231 | 3/1985 | Japan . |

Primary Examiner—Michael L. Gellner
Attorney, Agent, or Firm—Fitzpatrick, Cella, Harper & Scinto

[57] ABSTRACT

A camera system comprising an operation means for operating a film feeding part of a film cartridge. The operating means winds the film by feeding it out from the film cartridge, or it rewinds the film into the film cartridge. The camera system also has a drive force generating means for generating a drive force. The drive force is transmitted by both a first drive force transmitting means and a second drive force transmitting means. The first drive force transmitting means causes the operation means to drive the film in a winding direction. The second drive force transmitting means causes the film to be driven in the rewinding direction, where both drive forces are applied to the operation means.

18 Claims, 10 Drawing Sheets

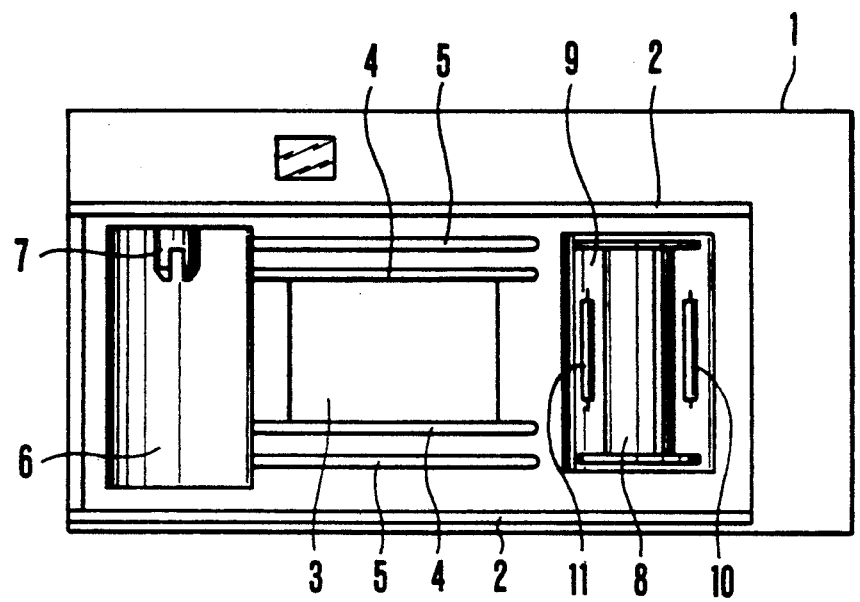
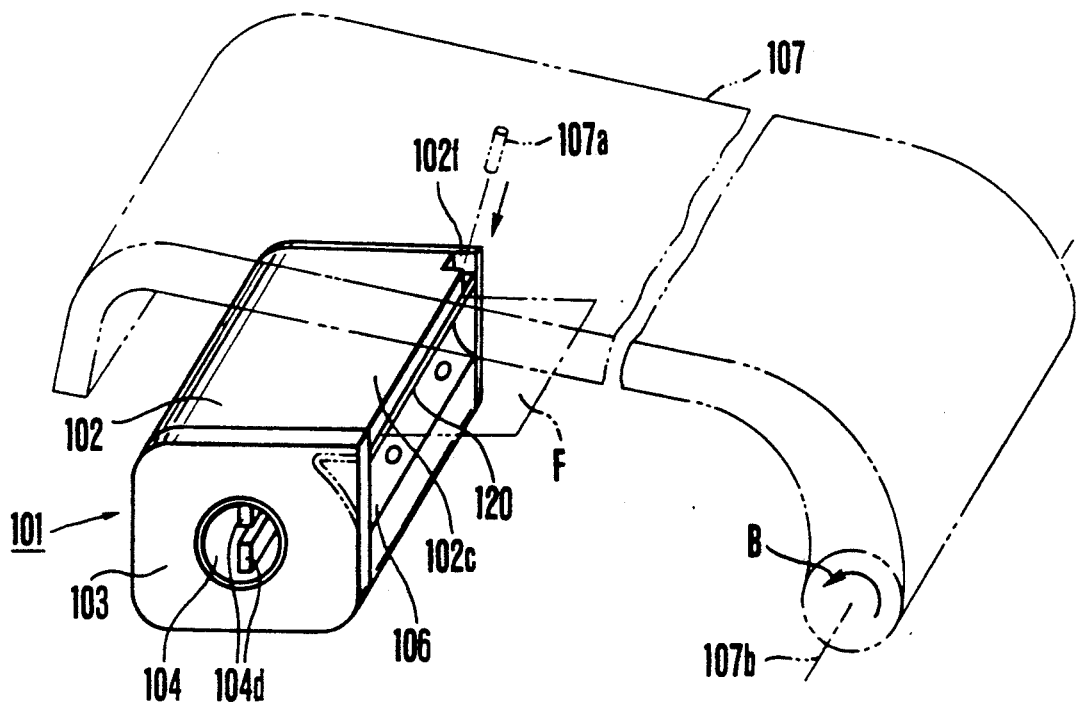

FIG.8
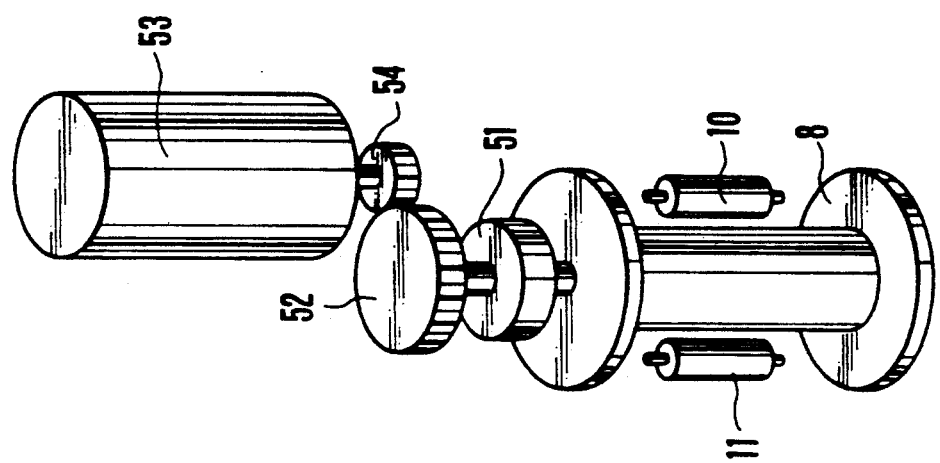
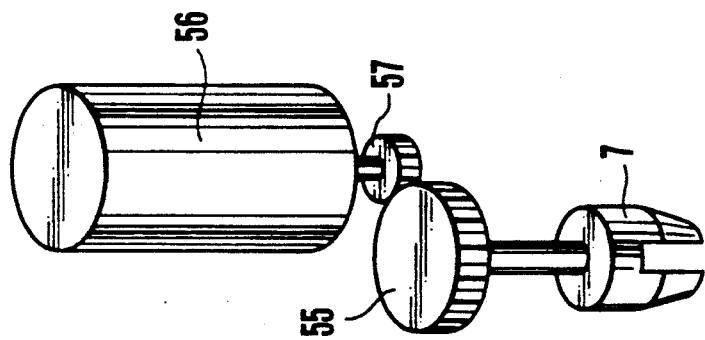

CAMERA SYSTEM

This application is a continuing application of Ser. No. 07/646,458 filed Jan. 25, 1991, which is a continuation of 07/400,104 filed Aug. 29, 1989 both now abandoned.

BACKGROUND OF THE INVENTION

1. Field of the Invention

This invention relates to a camera system which is arranged to feed a film in a simple manner.

2. Description of the Related Art

The film feeding device of the conventional camera has been arranged to have the camera loaded with a roll of film by having the leader part of the film which protrudes from a film cartridge engage with a sprocket or a take-up spool of the camera and by driving the sprocket or the take-up spool.

In accordance with the conventional arrangement, the camera necessitates the photographer to manually set the leader part of the film in position. This operation is, however, not only troublesome but also would fail to have the camera loaded with the film if the film leader part is not correctly set. Besides, the film might be exposed to light and ruined by inadvertent pulling.

SUMMARY OF THE INVENTION

This invention is aimed at the solution of the above-stated problem. It is therefore an object of the invention to provide a camera system consisting of a film cartridge which is arranged to pay out the film when a driving power is supplied to the driving power transmission part thereof and a camera which is arranged to supply the driving power to the driving power transmission part of the film cartridge to have the film paid out and to take up the paid out film on a film take-up spool, so that film feeding can be simply and easily accomplished.

The above and other objects and features of the invention will become apparent from the following detailed description of embodiments thereof taken in connection with the accompanying drawings.

BRIEF DESCRIPTION OF THE DRAWINGS

FIG. 3 is a rear elevation showing the same camera as viewed with the back cover thereof removed.

FIG. 4 is an oblique view showing by way of example a film cartridge arranged according to this invention.

FIG. 8 is an oblique view showing the film feeding device arranged as a further embodiment of this invention.

DETAILED DESCRIPTION OF THE PREFERRED EMBODIMENTS

Figure 1:
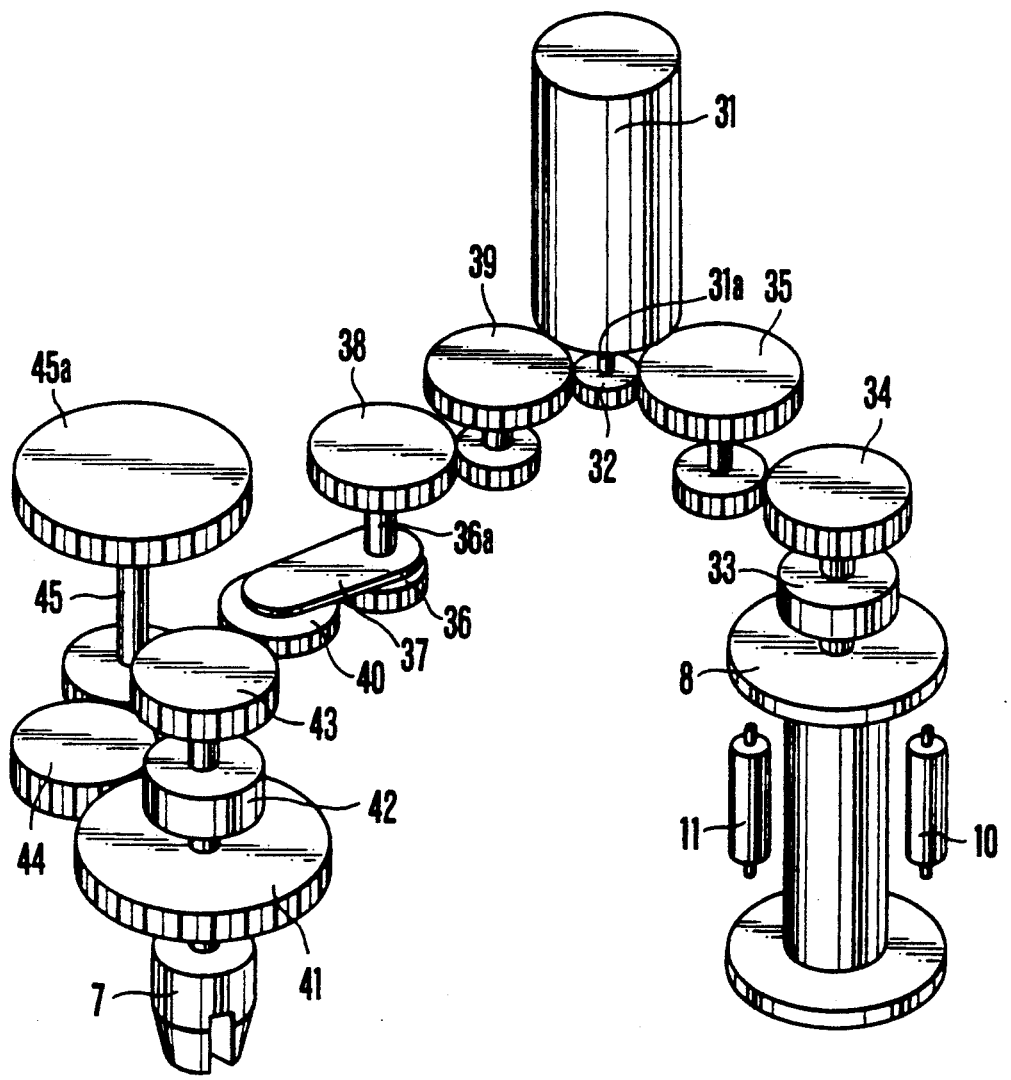
FIG. 1 is an oblique view showing the film feeding device of a camera arranged as an embodiment of this invention.
Figure 2:
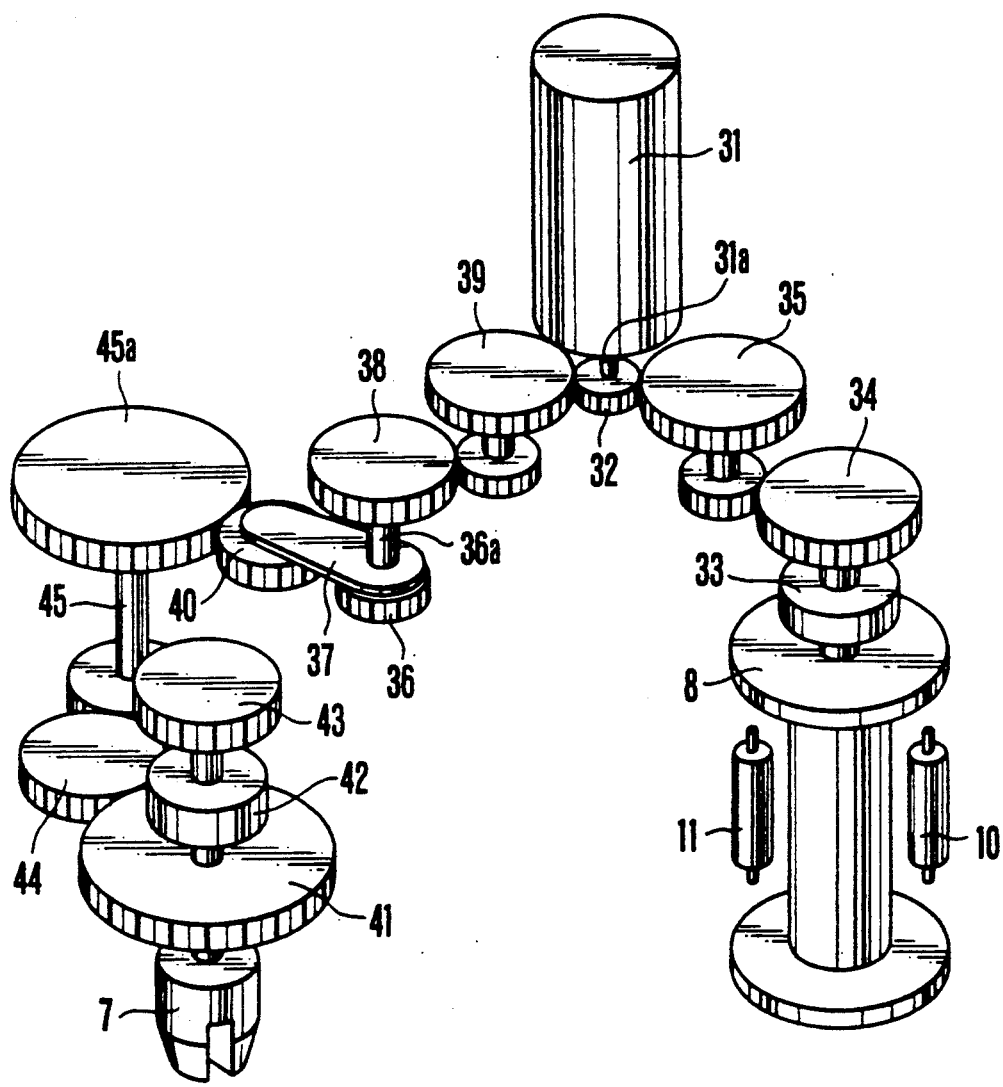
FIG. 2 is an oblique view showing the device of FIG. 1 as in an operating state.

FIGS. 1 to 3 show a camera arranged according to this invention as an embodiment thereof. Referring to FIG. 3 which shows the camera as viewed from behind with the back cover removed for the sake of illustration. In FIG. 3, the illustration includes a camera body 1; grooves 2 provided for the back cover; an aperture part 3; and inner and outer guide rails 4 and 5 for guiding a film. The inner rails 4 are provided for defining the forward and backward positions of the film. The outer rails 5 are provided for defining the vertical position of the film. A cartridge chamber 6 is arranged to have a film cartridge placed therein. A fork 7 is arranged to engage the supply spool of the film cartridge when the cartridge is placed within the cartridge chamber 6 and to be driven by the film feeding mechanism of the camera which will be described later. A film take-up spool 8 is disposed within a spool chamber 9 and is arranged to have the leader part of the film automatically wound around it by means of rollers 10 and 11 in a known manner which is, for example, as disclosed in Japanese Laid-Open Patent Application No. SHO 60-45231.

Figure 5A:
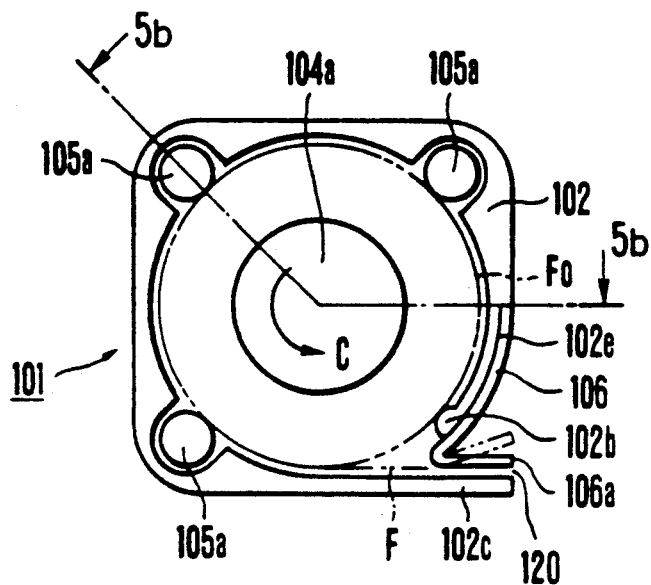
FIG. 5(a) is a transverse sectional view taken across the middle part of the film cartridge of FIG. 4.
Figure 5B:
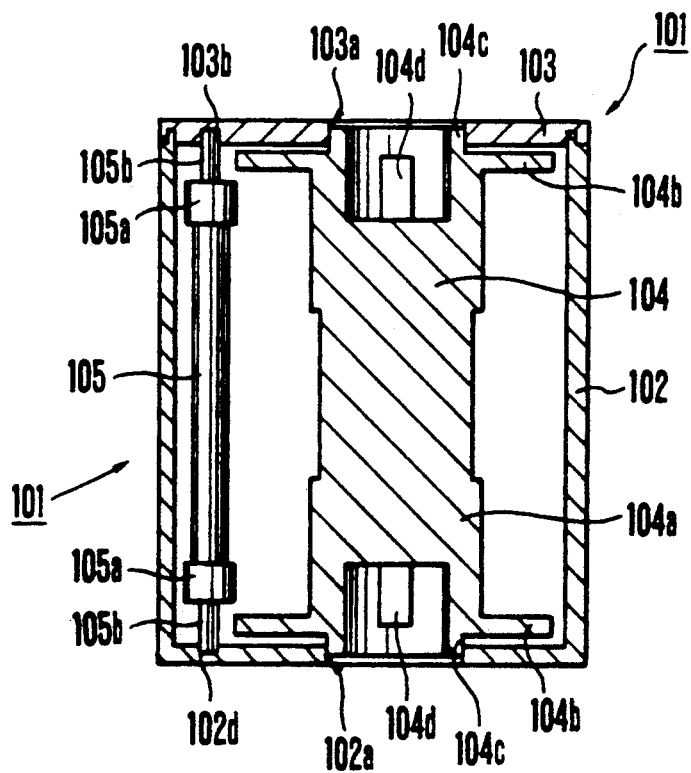
FIG. 5(b) is a sectional view taken along a line A—A of FIG. 5(a).

FIGS. 4, 5(a) and 5(b) show an embodiment of the film cartridge to be used for the camera of this invention. FIGS. 4 is an oblique view of the cartridge. FIG. 5(a) is a horizontal sectional view of the cartridge. FIG. 5(b) is a vertical sectional view taken along a line A—A of FIG. 5(a). Referring to these figures, the film cartridge 101 includes a cartridge body 102; an upper cover 103 which is secured to the cartridge body 102; and a supply spool 104. The supply spool 104 has the shaft part 104c thereof rotatably carried by the hole part 102a of the cartridge body 102 and the hole part 103a of the upper cover 103. The supply spool 104 has engaging parts 104d which are arranged at the ends of the spool 104 to engage the above-stated fork 7. Three roller shafts 105 have their shaft parts 105b rotatably carried by the hole parts 102d of the cartridge body 102 and the hole parts 103b of the upper cover 103. A protruding part 102b is formed in one body with the cartridge body 102. The protruding part 102b is made of an elastic synthetic resin material or the like and is in a cantilever shape with a protruding part formed on the inner side of the end of the part 102b. A spring member 106 is made of an elastic metal material or the like. A part of the spring member 106 extending along a curved part 102e of the cartridge body 102 is secured to the cartridge body 102 in a unified state with the latter. One end part 106a of the spring member 106 pushes an end part 102c of the cartridge body 102 with its bent spring force. The film F is wound around the supply spool 104 with one end thereof secured to the stem part 104a of the latter. The maximum diameter of the roll of film is restricted with the outermost circumferential face Fo of the film abutting on the roller parts 105a (three) of the roller shafts 105 and a protruding part 102b of the cartridge body 102. The leader part of the film F is pushed by the end part 106a cartridge body 102 at a mouth part 120. The leader part of the film F is inserted in between and pinched with the two end parts 102c and the 106a at the mouth part 120, in such a way as to have the film prevented from coming to the outside of the mouth part 120 of the film cartridge 101. The mouth part 120 is also arranged to prevent ambient light from coming into the cartridge. FIG. 4 shows the film F as in a state of being moved to the outside of the film cartridge via the mouth part 120.

After the cartridge 101 is loaded on the camera, the fore end part 106a of the spring member 106 is pushed downward through a cut-out part 102f of the cartridge body 102 by a projection 107a which is formed in one body with the back cover 107. Under this condition, the fore end part 106a of the spring member 106 is in a state as shown by a broken line in FIG. 5(a). The film F is no longer restricted by the fore end part 106a of the spring member 106 and the end part 102c of the cartridge body 102. When the supply spool 104 is rotated in the direction of paying out the film, i.e., in the direction of arrow c as shown in FIG. 5(a), the film F is smoothly paid out from the inside of the cartridge through the mouth part 120 in a spreading manner with a very small friction force against film feeding rotation, because the outermost circumferential face Of then contacts only with the roller parts 105a of the roller shafts 105 and the very small area of the protruding part 102b of the cartridge body 102. Further, with the camera loaded with the cartridge 101, the film F is no longer pinched by the end part 102c of the cartridge body 102 and the fore end 106a of the spring member 106 as mentioned above, the friction of this part is greatly lessened to ensure film feeding without difficulty. In rewinding the film F, the supply spool 104 is rotated in the film rewinding direction, which is reverse to the direction of arrow c as shown in FIG. 5(a). This causes the film to be rewound on the supply spool 104.

Figure 6A:
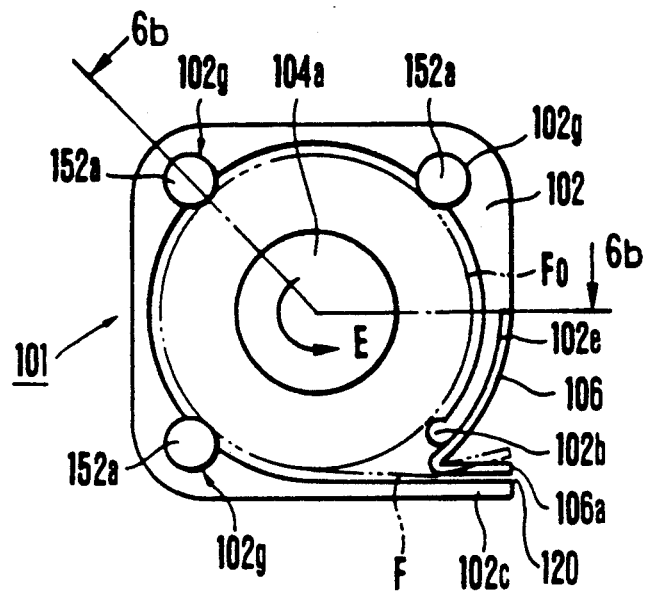
FIG. 6(a) is a transverse sectional view taken across the middle part of a film cartridge which is arranged also according to this invention as another embodiment of this invention.
Figure 6B:
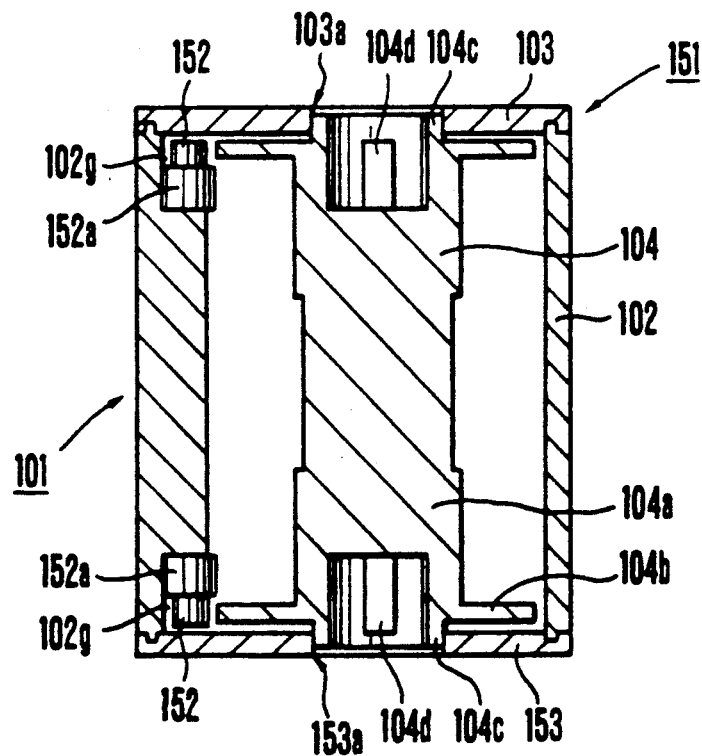
FIG. 6(b) is a sectional view taken along the line D—D of FIG. 6(a).

FIGS. 6(a) and 6(b) show another embodiment of the film cartridge arranged according to this invention. FIG. 6(a) is a horizontal section taken across the middle part of the cartridge and FIG. 6(b) a vertical section taken along a line D—D of FIG. 6(a). In these figures, the same component parts as those of the preceding embodiment are shown by the same reference numerals and the details of them are omitted from the following description: Rotors 152 are rotatably disposed within holes 102g which are provided in the cartridge body 102. The vertical positions of the rotors 152 are restricted by the upper and lower covers 103 and 153. One end of the film F is wound around the stem part 104a of the supply spool 104. The outermost circumferential face Fo of the film is in contact with the larger diameter parts 152a of the rotors 152 and the protruding part 102b of the cartridge body 102 to have the maximum diameter of the film coil restricted by them. When the supply spool 104 is rotated in the film feeding direction, i.e., in the direction of arrow E as shown in FIG. 6(a), the film is smoothly moved out from the inside of the cartridge as the outermost circumferential face Fo of the film coil F is merely in rolling contact with the larger diameter parts 152a of the rotors 152 and in contact with a very small area of the protruding part 102b of the cartridge body 102. The cartridge body 151 has an exit formed for the film F by the end part 102c thereof and the fore end part 106a of the spring member 106 in the same manner as the embodiment shown in FIGS. 5(a) and 5(b). The exit part is thus arranged to have a sufficiently small friction.

Figure 7A:
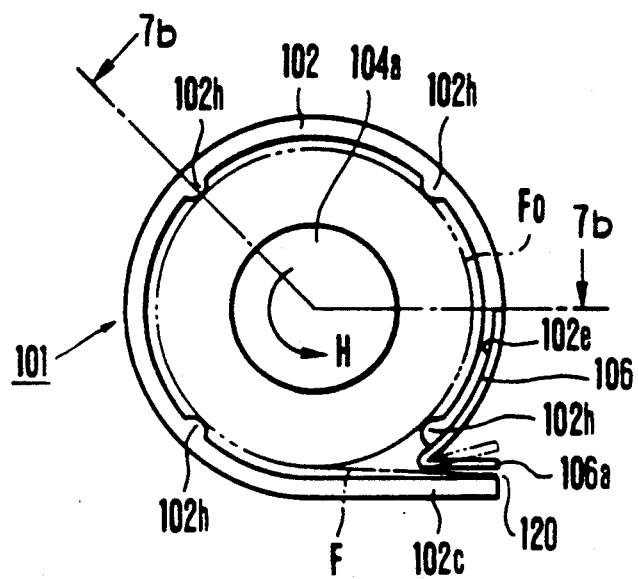
FIG. 7(a) is a transverse sectional view taken also across the middle part of a film cartridge which is arranged as a further embodiment of the invention.
Figure 7B:
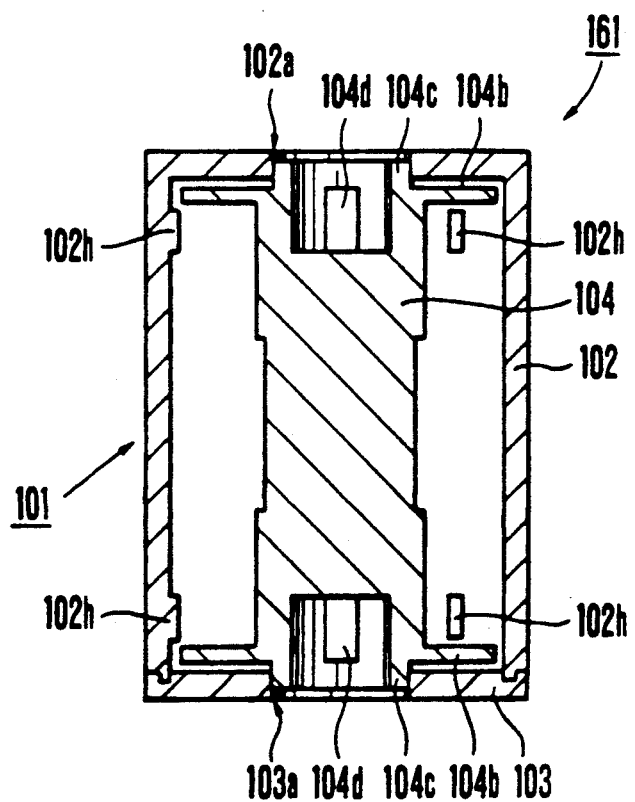
FIG. 7(b) is a sectional view taken along a line G—G of FIG. 7(a).

FIGS. 7(a) and 7(b) show a further embodiment of the cartridge arranged according to the invention. FIG. 7(a) is a section transversely taken across the middle part of the cartridge and FIG. 7(b) a longitudinal section taken along a line G—G of FIG. 7(a). The same component parts as those of the embodiment shown in FIGS. 5(a) and 5(b) are indicated by the same reference numerals and the details of them are omitted from the following description. A plurality of projections 102h are arranged on the inner circumferential face of the cartridge body 102 of the cartridge 161 to have very small areas of them in contact with the outermost circumferential face Fo of the coil of film F. This arrangement greatly reduces any frictional force of the outermost circumferential face Fo generated when the film is moved out from the cartridge 161, so that the film can be smoothly moved out.

FIGS. 1 and 2 show a film feeding mechanism arranged according to this invention. FIG. 1 shows this mechanism as in a state of taking up the film being paid out. FIG. 2 shows it as in a film rewinding state. Referring to FIGS. 1 and 2, a film driving motor 31 is provided with an output shaft 31a to which a pinion is secured. A take-up spool 8 which is mentioned in the foregoing description with reference to FIG. 3 has rollers 10 and 11 arranged in combination therewith. A winding gear 34 is mounted through a one-way clutch 33 on the upper end of the take-up spool 8. The one-way clutch 33 is arranged to be freely rotatable, for example, as shown in Japanese Laid-Open Patent Application No. SHO 55-17175. The clutch 33 transmits a driving power to the take-up spool 8 when the winding gear 34 of FIG. 1 rotates counterclockwise and does not transmit the driving power when the gear 34 rotates clockwise. A double gear 35 is arranged to connect the pinion 32 with the winding gear 34. A film winding gear train is formed by the pinion 32, the double gear 35 and the winding gear 34. A sun gear 36 is arranged to have a planet lever 37 rotatably carried by its shaft 36a. A gear 38 is secured to the upper end of the shaft 36a. A double gear 39 is arranged to connect the pinion 32 with the gear 38. A planet gear 40 is rotatably carried by one end of the above-stated planet lever 37. A fork 7 which is mentioned in the foregoing with reference to FIG. 3 has a rewinding gear 41 secured to the upper part thereof. Further, a feed gear 43 is disposed on the upper part of the fork through a one-way clutch 42. The one-way clutch 42 is arranged in a manner similar to the above-stated one-way clutch 33. The one-way clutch 42 transmits a driving power to the fork 7 when the feed gear 43 rotates counterclockwise and does not transmit it when the gear 43 rotates clockwise. The planet gear 40 is arranged to be connected to the feed gear 43 as shown in FIG. 1 when the sun gear 36 rotates counterclockwise from the state shown in FIG. 2. A film feeding gear train is thus formed by the pinion 32, the planet gear 40 and the feed gear 43. The reduction ratio of the film feeding gear train is arranged to be larger than that of the film winding gear train. A large gear 45a in the upper part of a double gear 45 which is connected via a gear 44 to the rewinding gear 41 is arranged to be connected to the planet gear 40 as shown in FIG. 2 when the sun gear 36 rotates clockwise in the state shown in FIG. 1. A film rewinding gear train is thus formed by the pinion 32, the double gear 39, the gear 38, the sun gear 36, the planet gear 40, the double gear 45, the gear 44 and the rewinding gear 41. The reduction ratio of the film rewinding gear train is arranged to be larger than that of the above-stated film winding gear train.

The embodiment of the invention arranged as described above operates as follows: The film cartridge 101 is first placed within the cartridge chamber 6. At this moment, the film F is not protruding to the outside from the mouth part 120 of the cartridge body 102. Following this, when the back cover of the camera which is not shown is closed, the mouth part 120 of the cartridge body 102 is opened by the structure described above. At the same time, a back cover switch which is not shown turns on to produce a signal. In response to this signal, a current is supplied to the film driving motor 31 to cause the motor 31 to rotate counterclockwise as viewed on FIG. 1. Then, the sun gear 36 also rotates counterclockwise. Therefore, the planet gear 40 revolves counterclockwise around the sun gear 36 to connect with the feed gear 43 as shown in FIG. 1. The feed gear 43, therefore, rotates counterclockwise to transmit a driving power to the one-way clutch 42. This causes the fork 7 to rotate counterclockwise. Since the fork 7 has engaged the engaging part 104d of the supply spool 104 within the cartridge body 102 when the cartridge 101 is placed within the cartridge chamber 6, the supply spool 104 also rotates counterclockwise as shown in FIGS. 5, 6 and 7. As a result, the film F is moved out from the mouth part 120. The rollers 105 then act to ensure that the film F is smoothly moved out without being bent. The fore end of the film F reaches the take-up spool 8 as the film feeding action progresses. The take-up spool 8 meanwhile has been caused to rotate counterclockwise by the film winding gear train consisting of the gears 32, 53 and 34 when the film driving motor 31 began to rotate counterclockwise. At this time, the counterclockwise rotation of the winding gear 34 causes the one-way clutch 33 to transmit the driving power. Therefore, a film winding action is performed with the leader part of the film F wound around the take-up spool 8. Then, since the reduction ratio of the film feeding gear train is larger than that of the film winding gear train, the take-up gear 34 rotates faster than the feed gear 43. Therefore, the fork 7 is driven by the winding gear 34 via the film F and the supply spool 104. As a result, the fork 7 rotates faster than the gear 43 and the transmission of the driving power is cut off by the one-way clutch 42. In other words, the faster rotation of the fork 7 than the feed gear 43 reversely rotates the feed gear 43 relative to the fork 7, so that the one-way clutch 42 can be caused to cut off the driving power transmission. Therefore, after the leader part of the film F is taken up on the take-up spool 8, the film winding action is performed solely by means of the take-up spool 8. This is the same as in the case of the conventional camera.

Upon completion of photographing for all the frames of the film F, the end of photographing is detected by known means, such as means for detecting information on the number of frames indicated by a DX code provided on the film cartridge. In response to a detection signal thus obtained, the film driving motor 31 rotates clockwise as viewed on FIG. 1, i.e., in the direction reverse to the film winding direction. An electric circuit which is arranged to cause the film driving motor 31 to make forward rotation or backward (reverse) rotation is arranged in a known manner as disclosed, for example, in Japanese Laid-Open Patent Application Laid-Open No. SHO 59-95520, etc.. With the motor 31 reversely rotated, the sun gear 36 rotates clockwise. The planet gear 40 revolves clockwise around the sun gear 36 to bring about a state shown in FIG. 2. This connects the gears 32, 39, 38, 36, 40, 45, 44 and 41 to each other to cause the rewinding gear 41 to rotate clockwise. The fork 7 which is arranged in one unified body with the gear 41 also rotates clockwise. As a result, the film is rewound with the supply spool 104 which engages the fork 7 also rotated clockwise as viewed on FIGS. 4 to 7. Further, although the clockwise rotation of the film driving motor 31 causes the winding gear 34 to rotate clockwise, the larger reduction ratio of the rewinding gear train than that of the winding gear train causes the winding gear 34 to rotate at a higher speed than the rotating speed of the take-up spool 8 which is rotated clockwise through the fork 7, the supply spool 104 and the film F. Therefore, the driving power is not transmitted by the one-way clutch 33. The film rewinding action can be accomplished without interfering with the film winding gear train.

FIG. 8 shows a film feeding device which is also arranged according to this invention as another embodiment thereof. Referring to FIG. 8, a reference numeral 8 denotes the above-stated take-up spool. Numerals 10 and 11 denote rollers. Above the take-up spool 8, there is provided a winding gear 52 which is connected via a one-way clutch 51 to the spool 8. The one-way clutch 51 is arranged and operates in the same manner as the one-way clutch 33 of FIG. 1. The winding gear 52 is arranged to engage a pinion 54 which is secured to the output shaft of a winding motor 53. A fork gear 55 is secured to the upper end of a fork 7. The fork gear 55 engages a pinion 57 which is secured to the output shaft of a fork driving motor 56. The film feeding device which is arranged in this manner operates as follows:

A cartridge 101 which is arranged as shown in FIGS. 4 to 7 is first placed within the cartridge chamer 6. When a back cover which is not shown is closed after that, a back cover switch which is not shown turns on to produce a signal. This signal causes a current to be applied to the fork driving motor 56. The motor 56 then rotates clockwise. The clockwise rotation of the motor 56 causes the fork 7 to rotate counterclockwise through the pinion 57 and the fork gear 55. Then, like in the case of the embodiment shown in FIG. 1, this causes a supply spool 104 to rotate within a cartridge body 102. As a result, the film F is moved out from the inside of the cartridge. When the fore end part of the film reaches the take-up spool 8 with the film feeding action progressed, the current supply to the fork driving motor 56 is cut off by means of a timer, switch or the like to be described in the embodiment shown in FIGS. 9 and 10. At the same time, a current is applied to the winding motor 53 to cause it to rotate clockwise. Then, the winding spool 8 rotates counterclockwise to have the film F taken up and wound around the spool 8 in the same manner as in the case of the embodiment shown in FIG. 1. In rewinding the film F, the current supply to the winding motor 53 is turned off and a current is applied to the fork driving motor 56 to cause it to rotate counterclockwise. The fork 7 then rotates clockwise to rewind the film F. In this instance, the winding spool 8 is caused to rotate clockwise through the film F. However, since the driving power transmission is cut off by the one-way clutch 51, the winding motor 53 is prevented from imposing any load on the film rewinding action.

Figure 9:
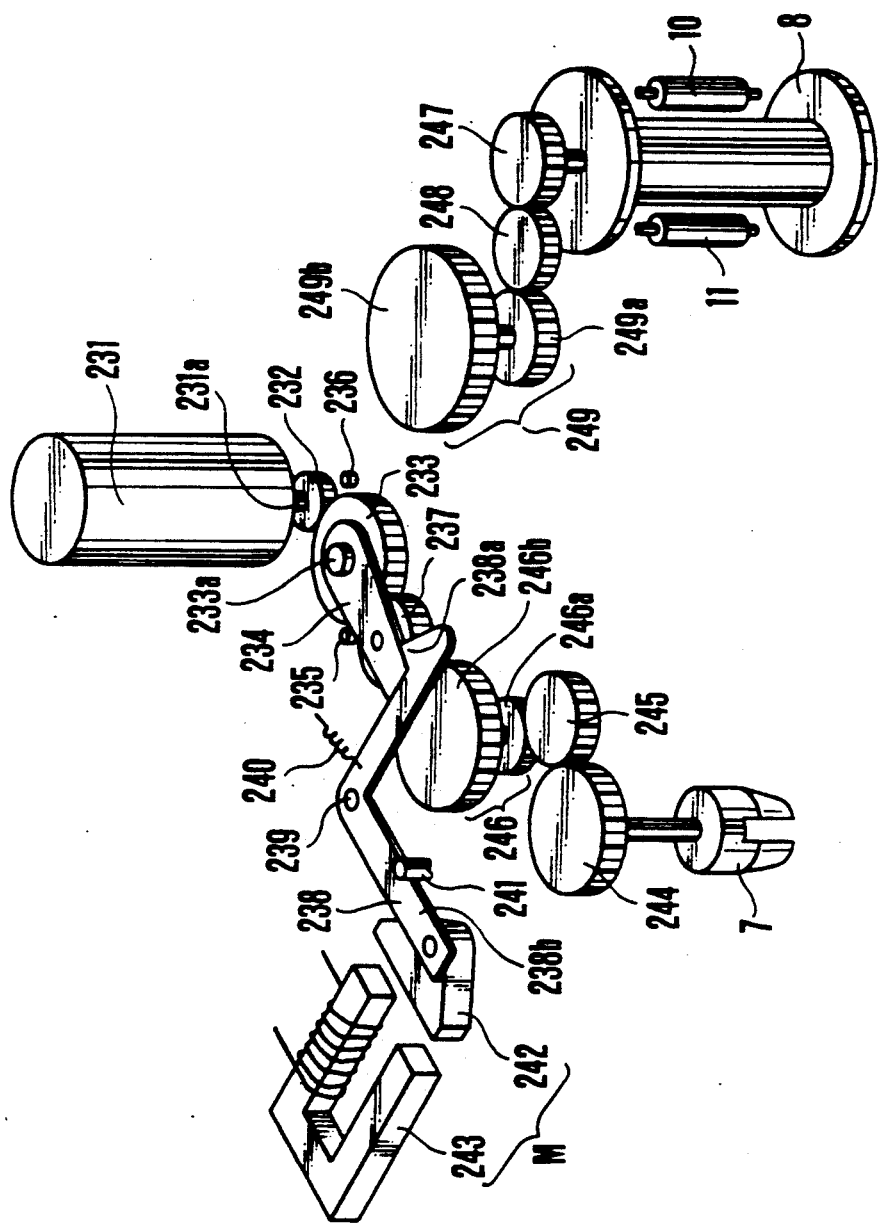
FIG. 9 is an oblique view showing the film feeding device of a camera arranged as a further embodiment of the invention.
Figure 10:
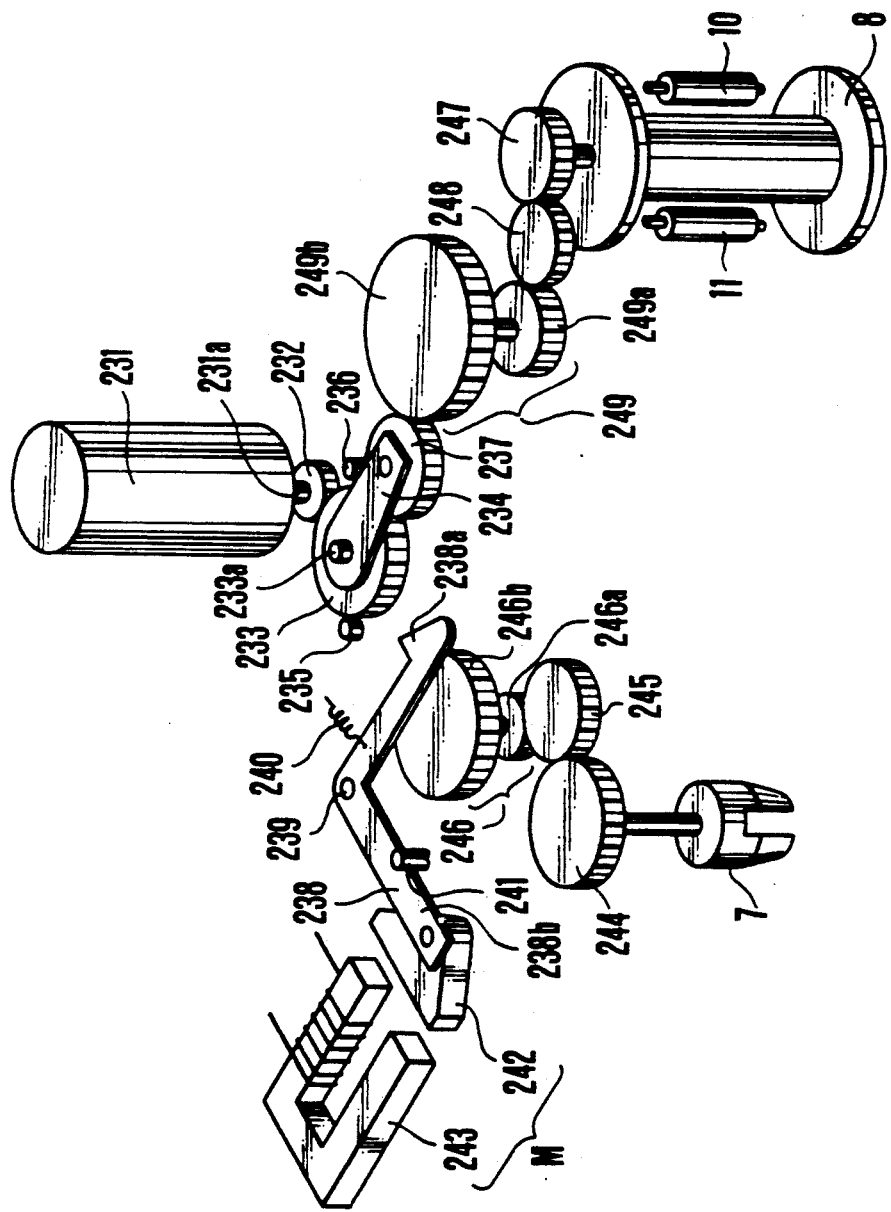
FIG. 10 is an oblique view showing the device of FIG. 9 as in an operating state.

A film feeding device which is arranged as a further embodiment of this invention is as shown in FIGS. 9 and 10. FIG. 9 shows it as in a state of performing a film feeding action. FIG. 10 shows it as in a state of performing a film winding action. Referring to these figures, a pinion 232 is secured to the output shaft 231a of a film driving motor 231. A sun gear 233 engages the pinion 232 and has a planet lever 234 rotatably carried by its shaft 233a. the clockwise and counterclockwise turning movements of the planet lever 234 are limited by stoppers 235 and 236 respectively. A planet gear 237 is rotatably carried by the planet lever 234 and engages the sun gear 233. A blocking lever 238 is an L-shaped blocking member and is rotatably carried by a shaft 239. A spring 240 is arranged to urge the blocking lever 238 to rotate counterclockwise. The counterclockwise movement of the lever 238 is restricted by a stopper 241. One end 238a of the lever 238 is formed in a hooklike shape to be capable of engaging the fore end of the planet lever 234. The other end 238b of the blocking lever 238 has the armature 242 of an electromagnet M rotatably attached thereto. The electromagnet M has a yoke 243 arranged to attract the armature 242 when a current is applied thereto. The fork 7 is arranged in the same manner as in the case of FIG. 3 and has a fork gear 244 secured to the upper end thereof. The fork gear 246 is connected via a transmission gear 245 to a smaller gear 246a of a double gear 246. The larger gear 246b of the double gear 246 is arranged to engage the planet gear 237 when the latter revolves clockwise (see FIG. 9). A fork driving gear train is thus formed by the pinion 232, the sun gear 233, the planet gear 237, the double gear 246, the transmission gear 245 and the fork gear 244.

A take-up spool 8 and rollers 10 and 11 are arranged in the same manner as in the case of FIG. 3. A winding gear 247 is secured to the upper end of take-up spool 8. The winding gear 247 is connected via a transmission gear 248 to the smaller gear 249a of a double gear 249. The larger gear 249b of the double gear 249 is arranged to engage the planet gear 237 when the latter revolves counterclockwise (see FIG. 10). A film winding gear train is thus formed jointly by the pinion 232, the sun gear 233, the planet gear 237, the double gear 249, the transmission gear 248 and the winding gear 247.

The film feeding device which is arranged as described above according to this invention operates in the following manner: The cartridge 101 which is arranged as shown in FIGS. 4 to 6 is first placed within the cartridge chamber 6 which is arranged as shown in FIG. 3. At this moment, no part of the film F is located outside the mouth part 120 of the cartridge 101. Next, when the back cover of the camera which is not shown is closed, the mouth part 102 of the cartridge body 102 is opened and the back cover switch which is also not shown turns on to produce a signal as mentioned in the foregoing. This signal causes a current supply to the film driving motor 231. The motor 231 then rotates clockwise. This causes the sun gear 233 to rotate counterclockwise. This brings about a counterclockwise revolving force on the planet gear 237. However, since the fore end of the planet lever 234 has its position restricted by the hook part 238a of the blocking lever 238, the planet gear 237 is only allowed to rotate is prevented from revolving (see FIG. 9). Therefore, the rotating power of the motor 231 is transmitted to the pinion 232, the sun gear 233, the planet gear 237, the double gear 246, the transmission gear 245 and the fork driving gear 244. This causes the fork 7 to rotate counterclockwise. As mentioned in the foregoing, the fork 7 engages the engaging part 104d of the supply spool 104 disposed within the cartridge body 102 when the cartridge chamber 6 is loaded with the cartridge 101. Therefore, the counterclockwise rotation of the fork 7 causes the supply spool 104 to rotate counterclockwise as viewed on FIGS. 5 to 7. As a result, the film F is moved out from the mouth part 120. Then, as mentioned in the foregoing, the rollers 105, etc. act to allow the film F smoothly moved out without being bent. A known circuit which is not shown effects a power supply to the yoke 243 of the electromagnet M for a predetermined period of time after the lapse of a given period of time from the power supply to the film driving motor 231. The above-stated given period of time is a length of time required for having the film F moved out of the cartridge body 102 and reach the take-up spool 8. For reliable change-over from the process of moving or feeding the film out from the cartridge over to the take-up process, this given period of time may be set at a value somewhat longer than a period of time normally required before arrival of the film F at the take-up spool in such a way as to absorb any variations and fluctuations in power supply voltage and the film feeding speed.

Figure 11:
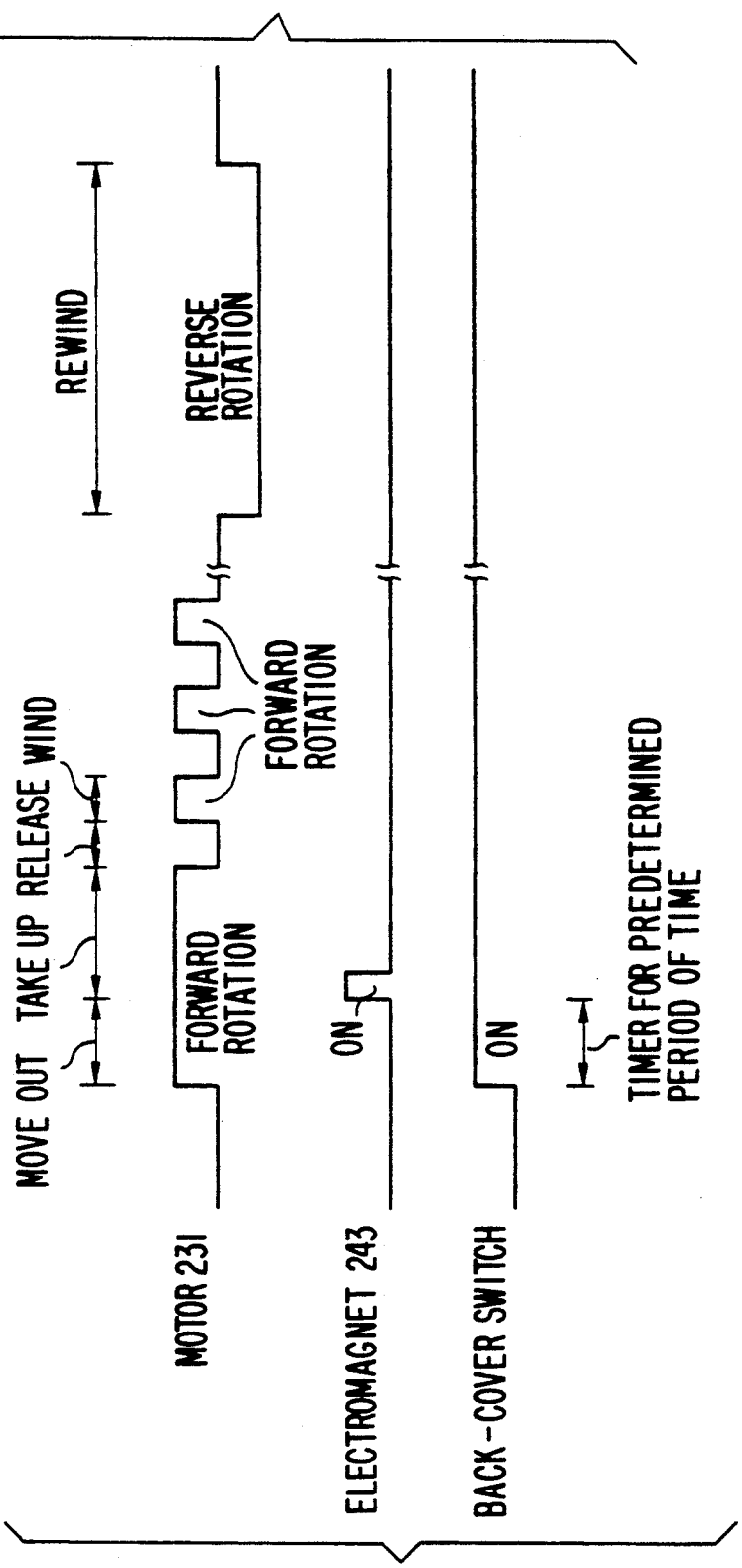
FIG. 11 is a time chart showing the operation of the device of FIG. 9.

The predetermined period of time for the power supply to the electromagnet M is a length of time required before the planet lever 234 is released from the blocking lever 238 by the revolution of the planet gear 237 and is about 100 ms. FIG. 11 is a time chart showing these processes. Referring to FIG. 11, when the power supply is effected to the yoke 243 of the electromagnet M, the armature 242 is attracted by the yoke 243. This causes the blocking lever 238 to turn around clockwise against the force of a spring 240 to disengage its hook part 238a from the fore end part of the planet lever 234. Since the sun gear 233 continues to rotate counterclockwise, the planet gear 237 keeps on revolving counterclockwise until the planet lever 234 comes to abut on the stopper 236. Then, there obtains a condition as shown in FIG. 10. The rotation of the film driving motor 231 thus causes take-up spool 8 to rotate counterclockwise through the pinion 232, the sun gear 233, the planet gear 237, the double gear 249, the transmission gear 248 and the winding gear 247. The leader part of the film F is then taken up and wound around the take-up spool 8 for film winding. When known film position detecting means detects that the film is wound up for the first frame part of it, preparation for photographing is completed with the rotation of the film driving motor 231 coming to a stop. After that, photographing can be repeatedly performed by releasing the shutter of the camera and by winding up each frame portion of the film with the film driving motor 231 caused to rotate clockwise (forward rotation).

After completion of photographing for all the frame portions of the film F, known means such as the DX signal of the film cartridge detects the end of the film. A detection signal thus obtained causes the film driving motor 231 to be rotated counterclockwise as viewed on FIG. 9, i.e., rotation in the direction reverse to the rotating direction for film winding (reverse rotation). An electric circuit to be used for causing the forward or reverse rotation of the film driving motor 31 is arranged in a manner known, for example, from Japanese Laid-Open Patent Application No. SHO 59-95520, etc.. With the motor caused to rotate counterclockwise, the gear 233 rotates clockwise. The planet gear 237 revolves clockwise around the sun gear 233. Eventually, the planet lever 234 comes to abut on the stopper 235 to bring about a condition as shown in FIG. 9. Since the planet gear 237 has a revolving force at the time of disengagement from the double gear 249, the planet lever 234 turns around pushing away the hook part 238a of the blocking lever 238 when the planet lever 234 revolves. This brings the film feeding device into the state shown in FIG. 9. Under this condition, the film driving motor 231 further rotates counterclockwise. Therefore, the rotating power of the film driving motor 231 is transmitted to the pinion 232, the sun gear 233, the planet gear 237, the double gear 246, the transmission gear 245 and the fork gear 244 one after another. This causes the fork 7 to rotate clockwise. Therefore, the spool 104 which is disposed within the cartridge and engages the fork 7 comes to rotate clockwise as viewed on FIGS. 5 to 7. The film F is thus rewound by the clockwise rotation.

In the case of this embodiment, a timer is used for determining the lapse of a given length of time after the commencement of film feeding and before the power supply to the yoke 243 of the electromagnet M. However, this may be changed, for example, as follows: The timer is replaced with a film winding detection switch which is arranged as disclosed in Japanese Laid-Open Patent Application No. SHO 58-68027 and the power supply to the electromagnet is effected when completion of film winding around the spool is detected by this switch.

The film cartridge suited for the film feeding device is not limited to the embodiment described. Any cartridge of the type moving the film out of the cartridge by the rotation of the supply spool is usable irrespective of the manner in which it is arranged.

While the embodiment described is arranged to move the film out of the cartridge by rotating the supply spool disposed within the cartridge, the invention is not limited to this arrangement. The arrangement may be changed to move the film out of the cartridge by means of a roller, a sprocket or the like arranged within the cartridge. Further, the cartridge arranged according to this invention is also applicable to the conventional camera arranged to pull the film out of the cartridge by means of the take-up spool disposed on the side of the camera. In that instance, the invented arrangement is highly advantageous as it reduces friction to a great degree in pulling out the film.

What is claimed is:

1. A camera comprising:
   (a) operation means for operating a film feeding portion of a film cartridge in a winding direction for feeding out a film from said film cartridge and in a direction for rewinding the film into said film cartridge;
   (b) drive force generating a means for generating drive force;
   (c) first drive force transmitting means for transmitting the drive force of said drive force generating means to said operation means to drive said operation means in the winding direction; and
   (d) second drive force transmitting means for transmitting the drive force of said drive force generating means to said operation means to drive said operation means in the rewinding direction.

2. A camera according to claim 1, wherein said operation means comprises a fork which engages with the film feeding portion of the film cartridge.

3. A camera according to claim 1, wherein said drive force generating means comprises a motor.

4. A camera according to claim 1, wherein said first drive force transmitting means comprises a gear system.

5. A camera according to claim 4, wherein said second drive force transmitting means comprises a gear system.

6. A camera according to claim 1, wherein said second drive force transmitting means comprises a gear system.

7. A camera according to claim 1, further comprising selection means for selectively actuating said first drive force transmitting means and said second drive force transmitting means.

8. A camera according to claim 7, wherein said selection means comprises planetary clutch means.

9. A camera according to claim 7, wherein said selection means comprises means for performing an automatic selection operation in accordance with an operation direction of said drive force generating means.

10. A film feeding apparatus for a camera, comprising:
    (a) operation means for operating a film feeding portion of a film cartridge in a winding direction for feeding out a film from said film cartridge and in a direction for rewinding the film into said film cartridge;
    (b) drive force generating means for generating a drive force;
    (c) first drive force transmitting means for transmitting the drive force of said drive force generating means to said operation means to drive said operation means in the winding direction; and
    (d) second drive force transmitting means for transmitting the drive force of said drive force generating means to said operation means to drive said operation means in the rewinding direction.

11. A film feeding apparatus for a camera according to claim 10, wherein said operation means comprises a fork which engages with the film feeding portion of the film cartridge.

12. A film feeding apparatus for a camera according to claim 10, wherein said drive force generating means comprises a motor.

13. A film feeding apparatus for a camera according to claim 10, wherein said first drive force transmitting means comprises a gear system.

14. A film feeding apparatus for a camera according to claim 13, wherein said second drive force transmitting means comprises a gear system.

15. A film feeding apparatus for a camera according to claim 10, wherein said second drive force transmitting means comprises a gear system.

16. A film feeding apparatus for a camera according to claim 10, further comprising selection means for selectively actuating said first drive force transmitting means and said second drive force transmitting means.

17. A film feeding apparatus for a camera according to claim 16, wherein said selection means comprises planetary clutch means.

18. A film feeding apparatus for a camera according to claim 16, wherein said selection means comprises means for performing an automatic selection operation in accordance with an operation direction of said drive force generating means.

* * * * *

UNITED STATES PATENT AND TRADEMARK OFFICE
CERTIFICATE OF CORRECTION

PATENT NO. : 5,160,953
DATED : November 3, 1992
INVENTOR(S) : IWASHITA ET AL.

It is certified that error appears in the above-identified patent and that said Letters Patent is hereby corrected as shown below:

COLUMN 3 line 25, "c" should read --C--; and
    line 29, "faces Of" should read --face Fo--.

COLUMN 6 line 1, "Laid Open" (second occurrence) should be deleted; and
    line 39, "cartridge chamer 6." should read --cartridge chamber 6.--.

COLUMN 7 line 9, "the" should read --The--.

COLUMN 9 line 59, "a means for generating" should read --means for--.

Signed and Sealed this

Thirtieth Day of November, 1993

Attest:

BRUCE LEHMAN

Attesting Officer     Commissioner of Patents and Trademarks